United States Patent
Jansson et al.

(10) Patent No.: US 10,226,820 B2
(45) Date of Patent: Mar. 12, 2019

(54) CEMENTED CARBIDE BODY AND METHOD FOR MANUFACTURING THE CEMENTED CARBIDE BODY

(71) Applicant: SECO TOOLS AB, Fagersta (SE)

(72) Inventors: Bo Jansson; Per Jonsson, Fors (SE); Tomas Persson, Avesta (SE)

(73) Assignee: SECO TOOLS AB, Fagersta (SE)

( * ) Notice: Subject to any disclaimer, the term of this patent is extended or adjusted under 35 U.S.C. 154(b) by 590 days.

(21) Appl. No.: 14/388,371

(22) PCT Filed: Mar. 26, 2013

(86) PCT No.: PCT/EP2013/000905
§ 371 (c)(1),
(2) Date: Sep. 26, 2014

(87) PCT Pub. No.: WO2013/143686
PCT Pub. Date: Oct. 3, 2013

(65) Prior Publication Data
US 2015/0056463 A1     Feb. 26, 2015

(30) Foreign Application Priority Data
Mar. 29, 2012 (EP) .................................. 12162058

(51) Int. Cl.
*B22F 7/06* (2006.01)
*B23B 51/02* (2006.01)
(Continued)

(52) U.S. Cl.
CPC .............. *B22F 7/062* (2013.01); *B23B 51/02* (2013.01); *B23C 5/10* (2013.01); *C04B 35/56* (2013.01); *C04B 35/64* (2013.01); *C04B 37/001* (2013.01); *C04B 37/006* (2013.01); *B22F 3/20* (2013.01); *B22F 3/225* (2013.01); *B22F 2005/001* (2013.01); *B23B 2222/28* (2013.01); *B23C 2222/28* (2013.01); *C04B 2235/6021* (2013.01); *C04B 2235/6022* (2013.01); *C04B 2237/12* (2013.01); *C22C 29/08* (2013.01); *Y10T 407/1948* (2015.01); *Y10T 408/89* (2015.01); *Y10T 428/12028* (2015.01)

(58) Field of Classification Search
USPC ....... 51/307, 309; 428/698; 75/240; 408/231
See application file for complete search history.

(56) References Cited

U.S. PATENT DOCUMENTS 4,350,528 A * 9/1982 Engle ...................... B22F 7/062
                                                                228/193
4,868,065 A * 9/1989 Maruyama ................ B22F 7/06
                                                                428/552

(Continued)

FOREIGN PATENT DOCUMENTS

CN    1947921 A      4/2007
CN    102223973 A   10/2011
(Continued)

OTHER PUBLICATIONS

English translation of DE 3208282.*
(Continued)

*Primary Examiner* — Archene Turner
(74) *Attorney, Agent, or Firm* — Corinne R. Gorski

(57) ABSTRACT

A method for manufacturing a cemented carbide body includes the steps of forming a first part of a first powder composition comprising a first carbide and a first binder phase, sintering the first part to full density in a first sintering operation, forming a second part of a second powder composition comprising a second carbide and a second binder phase, sintering the second part to full density in a second sintering operation, bringing a first surface of the first part and a second surface of the second part in contact, and joining the first and second surface in a heat treatment operation.

16 Claims, 5 Drawing Sheets

Figure 1:
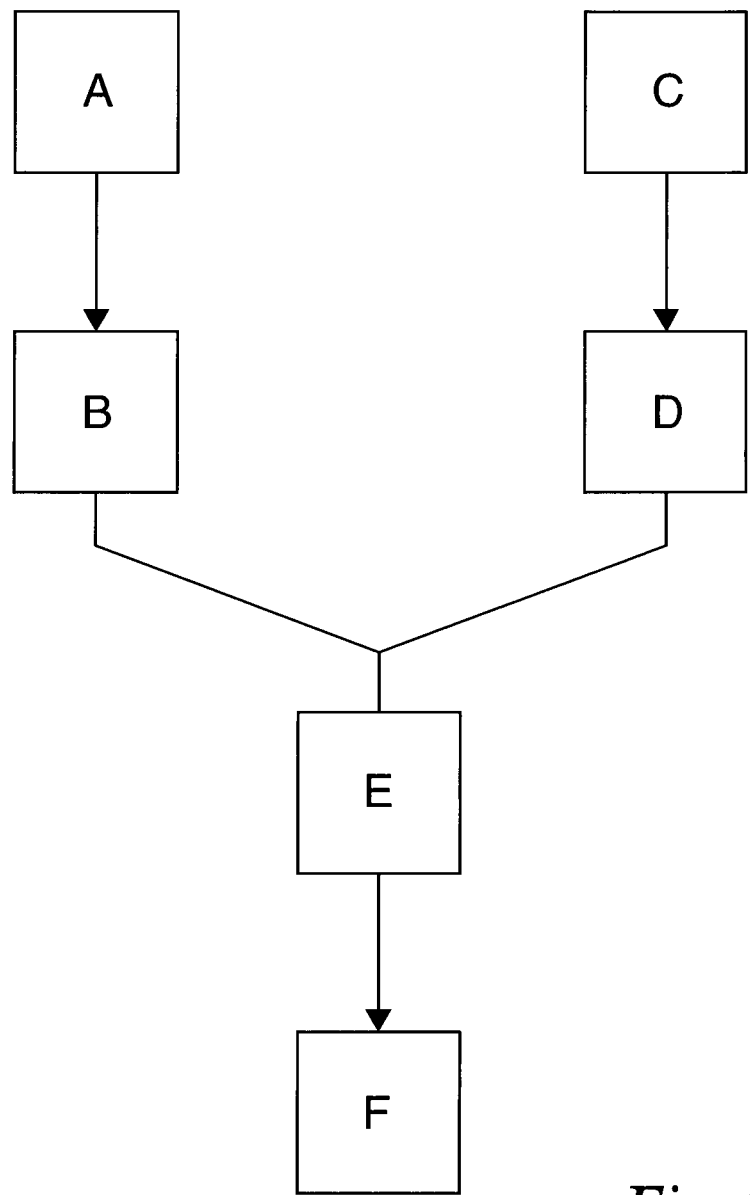

(51) Int. Cl.
  *B23C 5/10* (2006.01)
  *C04B 35/56* (2006.01)
  *C04B 35/64* (2006.01)
  *C04B 37/00* (2006.01)
  *B22F 3/20* (2006.01)
  *C22C 29/08* (2006.01)
  *B22F 5/00* (2006.01)
  *B22F 3/22* (2006.01)

(56) References Cited

U.S. PATENT DOCUMENTS

| | | |
|---|---|---|
| 5,333,520 A | 8/1994 | Fischer et al. |
| 6,033,788 A | 3/2000 | Cawley et al. |
| 6,241,433 B1 * | 6/2001 | Rydberg ............... B23B 31/11 |
| | | 408/231 |
| 6,551,551 B1 | 4/2003 | Gegel |
| 6,908,688 B1 | 6/2005 | Majagi |
| 2002/0005085 A1 | 1/2002 | Macki et al. |

FOREIGN PATENT DOCUMENTS

| | | | |
|---|---|---|---|
| DE | 3208282 | * | 10/1982 |
| EP | 0453428 A1 | | 10/1991 |
| JP | 2008-132539 | * | 6/2008 |

OTHER PUBLICATIONS

Wolfgang, Schedler. "Hartmetall fur den Praktiker". VDI-Verlag, 1988, ISBN: 3-18-400803-7, pp. 92-109.
Gopal, S. Upadhyaya. "Cemented Tungsten Carbides". Noyes publications, 1998, ISBN: 0-8155-1417-4, pp. 101-103 and 130-133.

* cited by examiner

CEMENTED CARBIDE BODY AND METHOD FOR MANUFACTURING THE CEMENTED CARBIDE BODY

RELATED APPLICATION DATA

This application is a §371 National Stage Application of PCT International Application No. PCT/EP2013/000905 filed Mar. 26, 2013 claiming priority of EP Application No. 12162058.7, filed Mar. 29, 2013.

FIELD OF THE INVENTION

The present invention relates to a cemented carbide body and a method for manufacturing thereof.

BACKGROUND OF THE INVENTION

Cemented carbide bodies, such as cutting members, conventionally are manufactured by powder pressing and sintering. Cemented carbides are composites comprising small grains in the micro meter range of at least one hard phase in a binder phase. The hard phase in cemented carbide is generally tungsten carbide (WC). In addition, other metal carbides with the general composition (Ti,Nb,Ta,W)C may also be included, as well as metal carbonitrides, for example, Ti(C,N). The binder phase usually comprises cobalt (Co) as a main constituent. Other compositions for the binder phase may also be used, for example, combinations of Co, Ni, and Fe, or Ni and Fe.

Industrial production of cemented carbide often includes mixing of given proportion of powders of raw materials and additives in the wet state using a milling liquid. The liquid is often an alcohol, for example, ethanol, or water, or a mixture thereof. The mixture is then milled into a homogeneous slurry. The wet milling operation is made with the purpose of deagglomerating and mixing the raw materials intimately. Individual raw material grains are also disintegrated to some extent. The obtained slurry is then dried and granulated, for example, by means of a spray dryer, and the granulate obtained may be used in uniaxial pressing of green bodies, in extrusion, or in injection moulding.

Hard metal bodies used for cutting members are conventionally manufactured by pressing and sintering. The desired form of the sintered body has to be obtained as far as possible before sintering because machining of a sintered body is expensive. Machining to the desired shape is therefore done, if necessary, in the as-pressed and/or pre-sintered condition after which the body is finally sintered. During sintering the body normally shrinks about 17% linearly The term "pressing" used here and in the following concerns pressing a material powder, such as tungsten carbide (WC) together with cobalt (Co), between a punch and a die such that a green body is formed. The pressing may be uniaxial or multiaxial.

For the manufacturing of parts with complex geometry, injection moulding or extrusion is preferably used. Injection moulding is often referred to as Powder Injection Moulding (PIM) when used in powder technology. Powder Injection Moulding requires a mould having the specific shape of the part to be manufactured. In powder injection moulding of tungsten carbide based hard metal parts, the following four consecutive steps are applied:

1. Mixing of granulated cemented carbide powder with a binder system to form a feedstock.
2. Performing Injection moulding using the mixed feedstock. The material is heated to 100-240° C., forced into a cavity with the desired shape, cooled and then removed from the cavity.
3. Removing the binder system from the obtained part, also called debinding.
4. Sintering of the parts. Common sintering procedures for cemented carbides are usually applied.

During sintering of a powder injection moulded part the part normally shrinks about 20% linearly Powder injection moulding of a large cemented carbide body sometimes results in cracks that are formed in the body during the sintering operation following the injection moulding. The problem with cracks after injection moulding, debinding and sintering tends to increase with increased material thickness of the injection moulded body.

U.S. Pat. No. 5,333,520 discloses a method for manufacturing a cemented carbide body for cutting tools, rock drilling tools or wear parts with complicated geometry. The cemented carbide body is manufactured by sintering together at least two parts that have been pressed to a green body before being sintered together. As the at least two parts shrink during sintering, there is a risk that the two parts will be subject to different shrinkage, and that this could lead to cracks in the cemented carbide body. Different shrinkage of the respective part could be a result of that different density is obtained in the part at the respective pressing operation.

It is therefore a desire to find an improved method to manufacture a metal cutting member of cemented carbide being composed of at least two parts formed in two separate forming operations without the risk for the formation of cracks in the cutting member.

OBJECT OF THE INVENTION

It is an object of the invention to provide a method to manufacture a metal cutting member where the formation of cracks in the cutting member is prevented. It is a further object of the invention to provide a metal cutting member having superior properties.

SUMMARY OF THE INVENTION

According to one aspect of the invention the above mentioned object is achieved by a method for manufacturing a cemented carbide body according to claim 1. The method comprises the following steps:

forming a first part of a first powder composition comprising a first carbide and a first binder phase, sintering the first part to full density in a first sintering operation, forming a second part of a second powder composition comprising a second carbide and a second binder phase, sintering the second part to full density in a second sintering operation, bringing a first surface of the first part and a second surface of the second part in contact, joining the first and second surface in a heat treatment operation, and performing the heat treatment operation for joining the at least first and second part at a temperature where the first binder phase and the second binder phase is in liquid state.

In this description and in the claims with full density is meant a density of at least 99.5 percent of theoretical density, preferably a density of at least 99.9 percent of theoretical density. By this the density of the first and second part will not change during the heat treatment operation.

As described in the background description of the invention cemented carbide comprises a hard phase of small grains in the micrometres range of a metal carbide, for example, tungsten carbide (WC) embedded in a binder phase.

By mechanically joining the first part and second part in a heat treatment operation a method is provided where the most suitable method can be used for manufacturing the respective part of the cemented carbide body, and thereby it is possible to optimize the manufacturing for the respective part in a cost efficient way and also achieve an excellent quality of the final product.

As the first and second parts are sintered to full density in the first and second sintering operation, there is no additional shrinkage in the heat treatment operation, which means that there is a good control of the final shape of the product and no further shrinkage of the cemented carbide body during the heat treatment operation assembling the at least two parts. The first and second parts may be sintered to a full density during the same sintering operation, or in different sintering operations, depending on the type of composition in the first and second part, and also depending on the size of the first and second part. The sintering of the first and second part, respectively, is performed at a temperature in the interval 1300° C.-1480° C., preferably in the interval 1340° C.-1440° C., for a time in the interval of 15 minutes-120 minutes.

According to one embodiment of the invention the method comprises forming the first part by injection moulding. According to one embodiment of the invention the method comprises the further step of arranging the first surface in contact with the second surface, before performing the heat treatment operation. The first and second surface must be plane and parallel to achieve a good contact during the heat treatment operation such that an excellent bonding is achieved at the interface. The substantially plane first and second surfaces are obtained directly from the forming operations, or by grinding before the sintering, or by grinding the respective surface after the sintering operation.

According to one embodiment of the invention, the method comprises performing the heat treatment operation at a temperature in the interval 1280-1550° C., preferably 1350-1420° C. for a time of 1-90 minutes, preferably 30-60 minutes. Thereby the first binder phase and the second binder phase are in liquid state for at least one minute and an excellent bonding between the first and second surface is achieved. During the at least one minute the first and second binder phase are in liquid state throughout the first and second part. The preferred temperature and time for the heat treatment operation depend on the size of the at least two parts being joined together and the composition of the respective part.

According to one embodiment of the invention the second part is formed in a uniaxial or multiaxial pressing operation.

According to one embodiment of the invention the method comprises the step of arranging at least one metal foil or metal film between and in contact with the first surface and second surface, before performing the heat treatment operation. The thin foil or film has a thickness in the interval of 0.005 to 0.5 mm, preferably 0.008 and 0.1 mm. The thin foil or film is made of metallic material, for example, one of the following materials: Iron, Nickel and Cobalt, or alloys thereof. By arranging a metal foil or film between the surfaces before the heat treatment operation improved wetting is achieved at the heat treatment.

According to one embodiment of the invention the method comprises the step of providing at least one recess on the first surfaces and at least one corresponding/matching protrusion on the corresponding surface of the second surface such that the relative position of the first and second surface is secured during the heat treatment operation.

According to one embodiment of the invention the contact between the first and second surface is secured by arranging the first and second part in a fixture during the heat treatment operation.

According to one embodiment of the invention the first part is injection moulded to a shape and dimension that is close to its final shape and dimension. Thereby the peripheral grinding of the part is reduced.

According to one embodiment of the invention the method comprises grinding at least one of the first and second surfaces to a plane surface after the first sintering operation and/or second sintering operation, such that the first and second surface will be parallel with each other when in contact and during the heat treatment operation. Preferably both the first and second surfaces are ground to plane surfaces having a surface tolerance of $R_a$<0.8 μm. By grinding at least one of the first and second surfaces to a plane surface such that the first and second surfaces are parallel to each other when in contact, the joint between the first and second surface will be strong and without voids.

According to one embodiment of the invention the first and/or second surface(s) are ground to a surface finish of $R_a$<0.8 μm.

Thereby an improved bonding between the first and second surface can be achieved.

According to a further aspect of the present invention a cemented carbide body is provided, the cemented carbide body comprising a first part and a second part, the first part being formed by injection moulding of a first powder composition comprising a first cemented carbide having a first binder phase, and being sintered to full density, the second part being formed of a second powder composition comprising a second cemented carbide having a second binder phase, and being sintered to full density, characterized in that the first surface of the first part is joined to the second surface of the second part in a heat treatment operation.

According to one embodiment of the invention the cemented carbide body comprises a first part and a second part joined together by heat treatment, wherein the first part is manufactured by injection moulding and sintering, wherein the first binder phase and the second binder phase has been heated to a liquid state during the heat treatment such that the first and second binder phase form one binder phase at the interface between the first and second part.

According to one embodiment of the invention the heat treatment is performed at a pressure of maximum 10 kPa. The heat treatment is for example performed in a vacuum furnace. This provides a simple and cost-effective way of joining the first and second part together.

According to one embodiment of the invention the first powder composition and the second powder composition, in each respective part, differ in composition and grain size. Thereby the properties may be adapted to those required by the respective part.

According to one embodiment of the invention the cemented carbide body is a cutting tool, such as a rotary cutting tool. The rotary cutting tool is, for example, an end mill or helix drill.

According to one embodiment of the invention the cemented carbide body is a rock drilling tool or wear part As the parts that are to be joined together by heat treatment in the heat treatment operation have already been sintered to their final density, i.e. a density that is close to the theoretical density, it is possible to use different compositions of the material in different parts of the cemented carbide body. The invention can be used for all compositions of cemented carbide and all WC grain sizes commonly used as well as for titanium based carbonitride.

According to one embodiment three or more parts are joined in the heat treatment operation by arranging at least one surface of the respective part in contact with a surface of one of the other parts. To facilitate the bonding the surfaces of the already sintered parts being in contact with each other are plane and parallel. By joining three or more parts in the heat treatment operation, cutting members with complex shape may be formed. As the parts are sintered to full density before the heat treatment operation there will be no additional shrinkage of the parts during the heat treatment, thereby it will be easy to manufacture cutting members having different material composition in different parts with an excellent bond between the parts.

Several additional steps may of course be performed in the method according to the invention, such as machining of the surfaces of the body before, or after, the heat treatment operation. Also, the body may be subject to at least one coating operation after the heat treatment operation.

SHORT DESCRIPTION OF THE DRAWINGS

Figure 2:
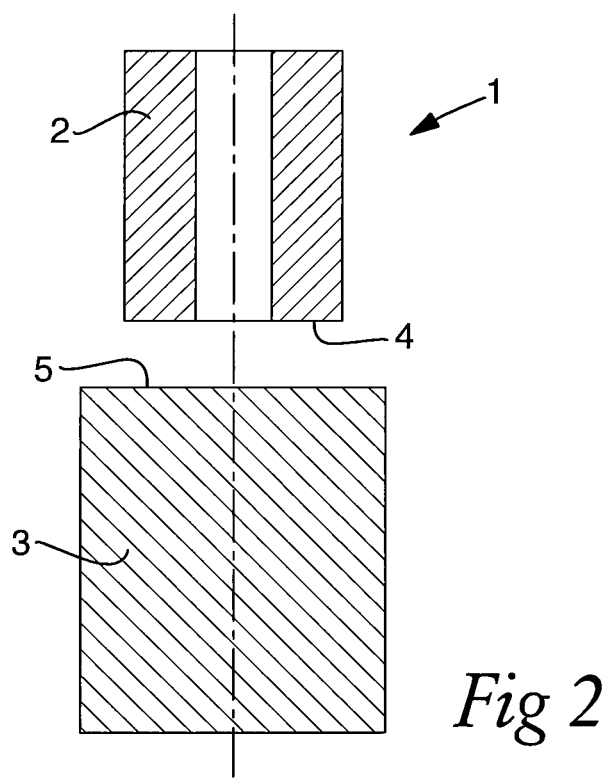
Figure 3:
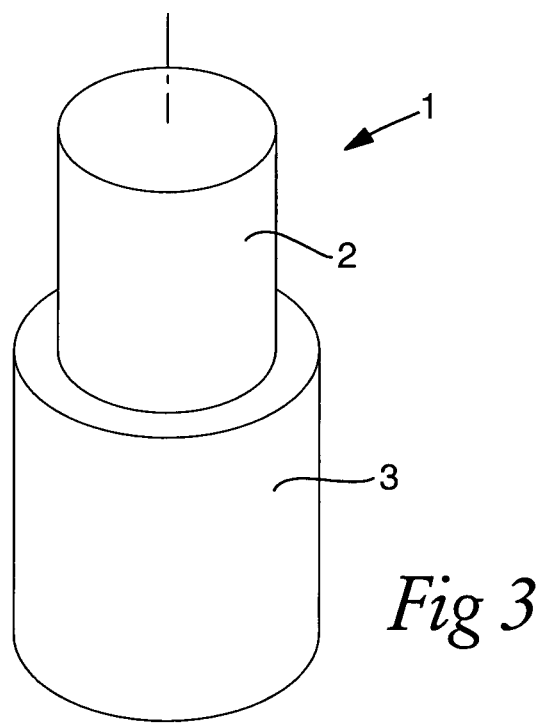
Figure 4:
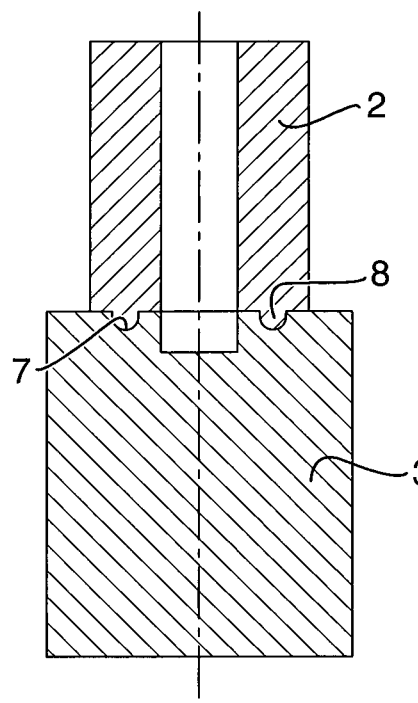
Figure 5:
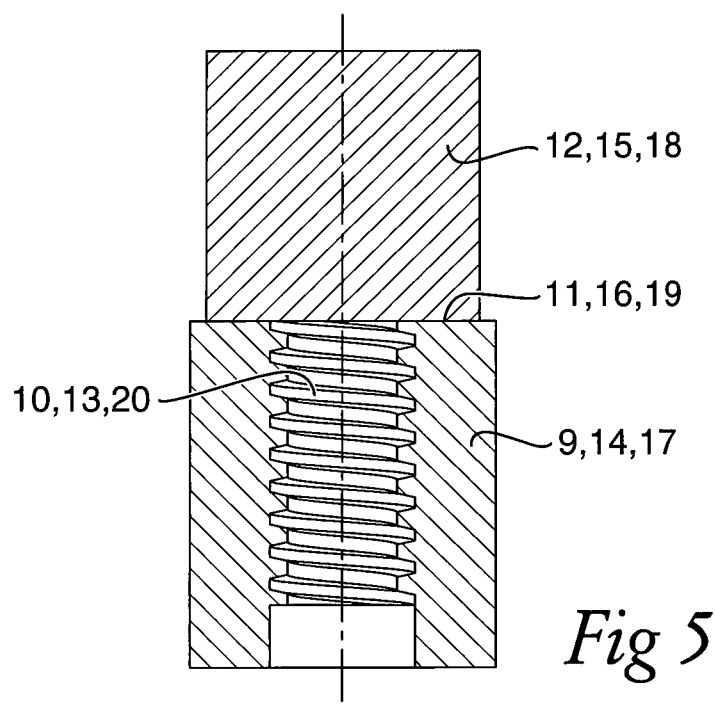
Figure 6:
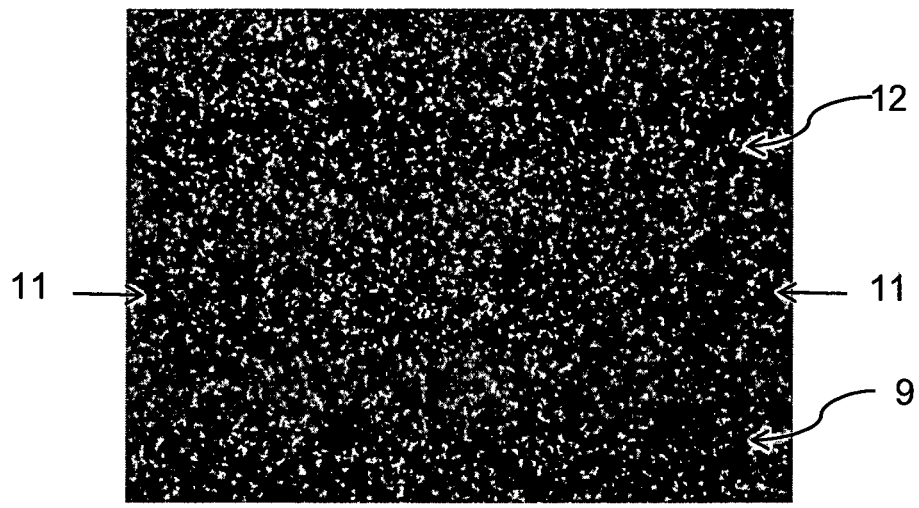
Figure 7:
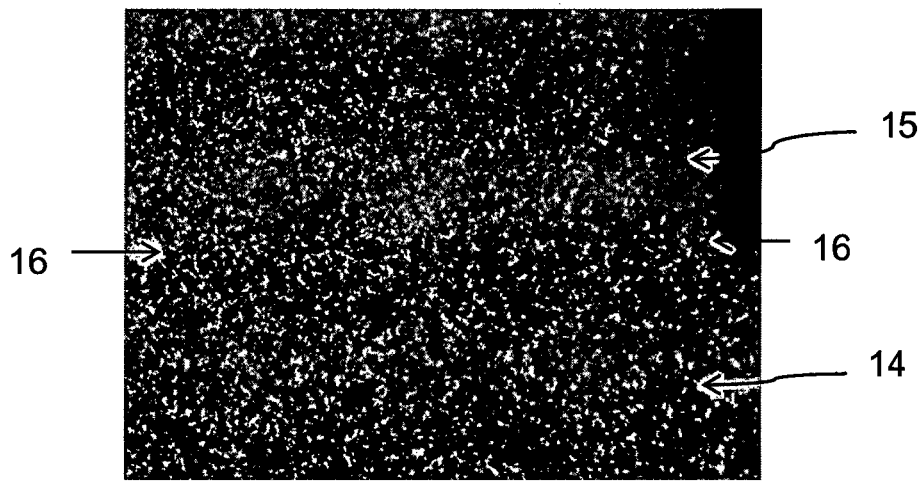
Figure 8:
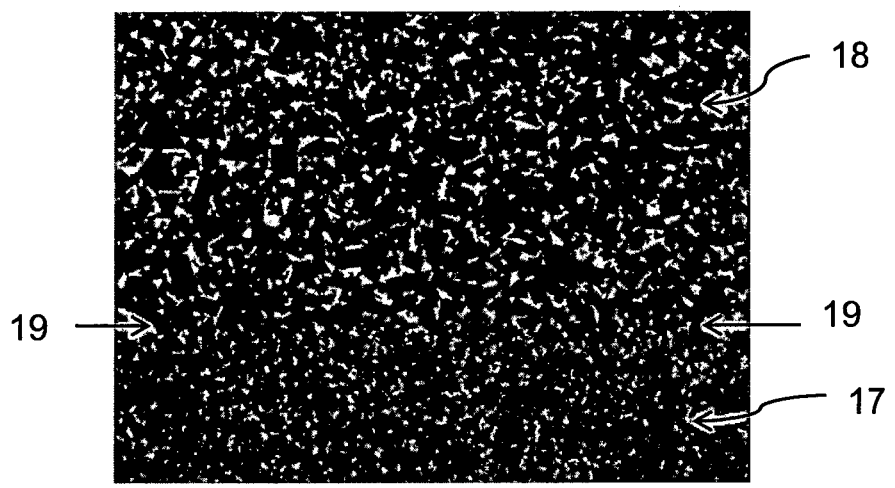

FIG. 1 is a flow chart according to one embodiment of the invention,

FIG. 2 is a cross-section of a first and second part to be joined together according to the invention, FIG. 3 is a perspective view of a cemented carbide body manufactured according to one embodiment of the invention, FIG. 4 is cross-section of an alternative embodiment of the invention, FIG. 5 is a cross-section of an exemplary embodiment of the invention, FIG. 6 is a light optical microscope (LOM) micrograph of the microstructure in a part of the cross-section shown in FIG. 5, FIG. 7 is a light optical microscope (LOM) micrograph of the microstructure in a cross-section of second exemplary embodiment of the invention, and FIG. 8 is a light optical microscope (LOM) micrograph of the microstructure in a cross-section of a third exemplary embodiment.

DETAILED DESCRIPTION OF PREFERRED EMBODIMENTS

FIG. 1 is a flowchart of a method for manufacturing a cemented carbide body 1 shown in FIG. 2 or 3, according to an exemplary embodiment of the invention, the method comprising:

A: forming a first part 2 by powder injection moulding a first powder composition comprising a first metal carbide and a first binder phase, B: sintering the first part 2 to full density, C: forming a second part 3 by pressing a second powder composition comprising a second metal carbide and a second binder phase, D: sintering the second part 3 to full density, E: bringing a first surface 4 of the first part 2 and a second surface 5 of the second part 3 in contact, F: joining the first surface 4 of the first part 2 with a second surface 5 of the second part 3 in a heat treatment operation.

The heat treatment operation is performed at a temperature and a time such that the binder phase of the first and second parts are in a liquid state during at least 1 minute. According to an exemplifying embodiment, the temperature is in the interval 1350-1420° C. during a time of 30-60 minutes. As the respective part has already been sintered to full density there is no additional shrinkage of the parts during the heat treatment operation. The temperature and time that is necessary for obtaining a liquid state during the heat treatment operation depend mainly on the material composition, but also on the shape and dimension of the respective parts to be joined.

According to one exemplifying embodiment, at least one thin foil or film (not shown) is arranged between and in contact with the first surface 4 and second surface 5, see FIG. 2, before performing the heat treatment operation. The thin foil or film has a thickness in the interval of 0.005 to 0.5 mm, preferably a thickness in the interval 0.008 and 0.1 mm. The thin foil or film is, for example, one of the following materials: Iron, Nickel and Cobalt, or alloys thereof. By arranging at least one foil between the surfaces to be joined by heat treatment the joining of the two surfaces could be facilitated.

According to one exemplifying embodiment, at least one of the ground surfaces comprises a groove (not shown) before the first and second parts are joined by the heat treatment operation. The groove could, for example, be used to transport coolant fluid to the cutting edge.

EXAMPLES

In the following the invention will be further exemplified with reference to some tests that have been performed to show the effect of the invention. It is to be noted that the invention is not to be limited to those examples but could be performed also for other powder compositions, as well as for other combinations of different types of powder compositions. In addition, both the first part and the second part could be manufactured by the same method, for example, powder injection moulding, before joining them by the heat treatment operation. In the examples below and in the drawings only one type of geometry is shown, however, the claimed method could be used for joining any at least two parts of a cemented carbide body, especially a rotary cutting tool, such as an end mill or helix drill.

It is also to be noted that the invention is not limited to only two parts being joined in the heat treatment operation, any number of parts that is practically feasible to join could be joined by arranging plane and parallel surfaces in contact with each other during the heat treatment operation.

Although the drawings only show that the first and second surface are arranged parallel and in contact in a horizontal plane it should be noted that the plane and parallel surfaces could be arranged vertically, or even inclined to the horizontal plane, during the heat treatment operation, as long as the surfaces are in contact by for example arranging them in a fixture. This is possible due to the fact that the at least two parts are already fully sintered when subject to the heat treatment operation, and there will be no additional shrinkage of the parts.

Example 1

FIG. 5 shows an injection moulded and sintered blank comprising a key grip in one part of the blank seen in the longitudinal direction of the blank. The key grip is in the following called a first part 9 and has an internal thread 10 passing through the first part in a longitudinal direction of the first part. The injection moulded blank also comprises flutes (not shown) at the other end of the blank. The blank being made of cemented carbide A, with a composition of 0.8 µm WC, 13 wt % Cobalt and 0.56 wt % Chromium, and being sintered to full density. The injection moulded blank was cut at the transition between the first part 9 and the flutes. The cut surface on the first part 9 was prepared by surface grinding by a diamond grinding disc in a Jungner grinding machine to a surface tolerance of $R_a$<0.8 µm.

A pressed and sintered SNUN 120408 (ISO designation) insert of a cemented carbide, with a composition of 0.8 µm WC, 13 wt % Cobalt and 0.56 wt % Chromium, in the following called a second part 12, was sintered to full density. The second part 12 was flat ground on a surface that should face the ground surface of the first part 9. The second part 12 was placed on top of the first part 9 with the ground surfaces facing each other and being in contact as shown in FIG. 5. The ground surfaces facing each other were joined in a heat treatment operation in a vacuum furnace at 1390° C. for 60 minutes.

The resulting cemented carbide body was cut perpendicular to the joint 10 between the powder injection moulded first part 9 and the pressed second part 12 and inspected with Light Optical Microscope (LOM). The inspection revealed that there were no cracks or voids in the joint 10. FIG. 6 shows a light optical micrograph of the joint 13 between the injection moulded first part 9, and the pressed second part 12.

For the cemented carbide body in example 1 no lines of cobalt or voids could be found anywhere along the joined surfaces when inspecting the microstructure in a light optical microscope. The joint is invisible when inspecting the microstructure in LOM.

Example 2

FIG. 5 shows an injection moulded and sintered blank comprising a key grip in one part of the blank seen in the longitudinal direction of the blank. The key grip is in the following called a first part 14 and has an internal thread 13 passing through the first part in a longitudinal direction of the first part. The injection moulded blank also comprises flutes (not shown) at the other end of the blank. The injection moulded blank being made of cemented carbide A, with a composition of 0.8 µm WC, 13 wt % Cobalt and 0.56 wt % Chromium, and being sintered to full density. The injection moulded blank was cut at the transition between the first part 14 and the flutes. The cut surface on the first part 14 was prepared by surface grinding by a diamond grinding disc in a Jungner grinding machine to a surface tolerance of $R_a$<0.8 µm.

A pressed and sintered SNUN 120408 (ISO designation) insert of a cemented carbide, with a composition of 0.8 µm WC, 10 wt % Cobalt and 0.43 wt % Chromium, in the following called a second part 15, was sintered to full density. The second part 15 was flat ground on a surface that should face the ground surface of the first part 14. The second part 15 was placed on top of the first part 14 with the ground surfaces facing each other and being in contact as shown in FIG. 5. The ground surfaces facing each other were joined in a heat treatment operation in a vacuum furnace at 1390° C. for 60 min.

The resulting cemented carbide body was cut perpendicular to the joint 16 between powder injection moulded first part 14 and the pressed second part 15 and inspected with Light Optical Microscope (LOM). The inspection revealed that there were no cracks or voids in the interface 16 between the powder injected moulded first part 14 and the second part 15. FIG. 7 shows a light optical micrograph of the joint 16 between the injection moulded first part 14, and the second part 15.

From FIG. 7 it can be seen that there is a difference in the microstructure between the powder injected moulded first part 14 and the microstructure in the pressed second part 15. There are larger white areas in the microstructure of the first part, but this is only due to the fact that there is a difference in cobalt content between the two materials. The joint 16 between the first and second surface is invisible when inspecting the microstructure in LOM.

Example 3

FIG. 5 shows an injection moulded and sintered blank comprising a key grip in one part of the blank seen in the longitudinal direction of the blank. The key grip is in the following called a first part 17 and has an internal thread 20 passing through the first part in a longitudinal direction of the first part. The injection moulded blank also comprises flutes (not shown) at the other end of the blank. The blank being made of cemented carbide A, with a composition of 0.8 µm WC, 13 wt % Cobalt and 0.56 wt % Chromium, and being sintered to full density. The injection moulded blank was cut at the transition between the first part 17 and the flutes. The cut surface on the first part 17 was prepared by surface grinding by a diamond grinding disc in a Jungner grinding machine to a surface tolerance of $R_a$<0.8 µm.

A pressed and sintered blank of cemented carbide, with a composition of 2.8 µm WC, 7 wt % Cobalt, 0.28 wt % Chromium, in the following called a second part 18, was sintered to full density. The second part 18 was flat ground on the surface that should face the ground surface of the first part 17. The second part 18 was placed on top of the first part 17 with the ground surfaces facing each other and being in contact as shown in FIG. 5. The ground surfaces facing each other were joined in a heat treatment operation in a vacuum furnace at 1390° C. for 60 minutes.

The resulting cemented carbide body was cut perpendicular to the joint 19 between powder injection moulded first part 17 and the pressed second part 18 and inspected with Light Optical Microscope. The inspection revealed that there were no cracks or voids in the joint 19 between the powder injected moulded first part 17 and the pressed second part 18. FIG. 8 shows a light optical micrograph of the joint 19 between the injection moulded first part 17, and the pressed second part 18.

For the cemented carbide body in example 3 the joint between the surfaces that have been joined by heat treatment is visible due to the difference in grain size between the two materials.

Conclusion from Examples 1, 2 and 3:

From examples 1, 2, and 3 it can be seen that a void free joint can be achieved when joining two fully sintered parts of cemented carbide by heat treatment. The heat treatment was performed at a temperature where the binder phases of the first and second part are in liquid state such that the void free joint 11, 16, 19 is achieved.

When cemented carbide bodies comprising two parts joined by heat treatment according to examples 1, 2 and 3 have been subject to machining test for evaluating the weakest spot in the cemented carbide body, it was shown that the joint between the two parts had full strength as the cemented carbide body did not break at the joint.

Example 4

A thin 0.01 mm thick Fe foil was arranged between, and in contact with, the first surface and the second surface, before performing a heat treatment operation at a temperature of 1390° C. with a holding time of 60 minutes. The resulting cemented carbide body was cut perpendicular to the joint between powder injection moulded first part and second part, and the joint was inspected with Light Optical Microscope. The inspection revealed that there are no traces of the Fe-foil in the microstructure at the joint after the heat treatment operation.

The invention claimed is:

1. A method for manufacturing a cemented carbide body, comprising the steps of:
    forming a first part of a first powder composition having a first carbide and a first binder phase by injection moulding;
    sintering the first part to full density in a first sintering operation;
    forming a second part of a second powder composition having a second carbide and a second binder phase by uniaxial pressing;
    sintering the second part to full density in a second sintering operation;
    after sintering of the first and second parts, bringing a first surface of the first part and a second surface of the second part into contact;
    joining the first and second surface in a heat treatment operation; and
    performing the heat treatment operation for joining the first and second parts at a temperature where both the first binder phase and the second binder phase are in a liquid state for at least one minute.

2. A method according to claim 1, wherein the heat treatment operation is performed at a temperature of 1280-1550° C. for a time of 1-90 minutes.

3. A method according to claim 2, wherein the heat treatment operation is performed at a temperature of 1350-1420° C.

4. A method according to claim 2, wherein the heat treatment operation is performed for a time of 30-60 minutes.

5. A method according to claim 1, further comprising the step of arranging at least one metal foil between the first surface and the second surface before performing the heat treatment operation.

6. A method according to claim 5, wherein the contact between the first and second surface during the heat treatment operation is secured by securing the first and second surface in a fixture.

7. A method according to claim 1, further comprising the step of providing at least one recess on one of the first and second surfaces, and at least one protrusion on the other of the first and second surface, which is arranged to fit in the at least one recess, wherein the relative position of the first and second surface is secured during the heat treatment operation.

8. A method according to claim 1, further comprising the step of grinding the first and second surface to plane and parallel surfaces.

9. A method according to claim 8, wherein the first and/or second surfaces are ground to a surface finish of Ra<0.8 µm.

10. A cemented carbide body produced according to the method of claim 1.

11. A cemented carbide body according to claim 10, wherein the first and second parts each have a different material composition.

12. A cemented carbide body according to claim 10, wherein the cemented carbide body is a rotary cutting tool.

13. A cemented carbide body according to claim 12, wherein the rotary cutting tool is an end mill.

14. A cemented carbide body according to claim 12, wherein the rotary cutting tool is a helix drill.

15. A method for manufacturing a cemented carbide body, comprising the steps of:
    forming a first part of a first powder composition having a first carbide and a first binder phase by extrusion;
    sintering the first part to full density in a first sintering operation;
    forming a second part of a second powder composition having a second carbide and a second binder phase by uniaxial pressing;
    sintering the second part to full density in a second sintering operation;
    after sintering of the first and second parts, bringing a first surface of the first part and a second surface of the second part into contact;
    joining the first and second surface in a heat treatment operation; and
    performing the heat treatment operation for joining the first and second parts at a temperature where both the first binder phase and the second binder phase are in a liquid state for at least one minute.

16. A method for manufacturing a cemented carbide body, comprising the steps of:
    forming a first part of a first powder composition having a first carbide and a first binder phase by injection moulding;
    sintering the first part to full density in a first sintering operation;
    forming a second part of a second powder composition having a second carbide and a second binder phase by multiaxial pressing;
    sintering the second part to full density in a second sintering operation;
    after sintering of the first and second parts, bringing a first surface of the first part and a second surface of the second part into contact;
    joining the first and second surface in a heat treatment operation; and
    performing the heat treatment operation for joining the first and second parts at a temperature where both the first binder phase and the second binder phase are in a liquid state for at least one minute.

* * * * *